Dec. 17, 1963  C. D. NIVEN  3,114,255

THERMAL CONDUCTIVITY APPARATUS

Filed Dec. 18, 1961

INVENTOR
Charles D. Niven
BY Harold Q. Weir
PATENT AGENT

United States Patent Office 3,114,255
Patented Dec. 17, 1963

3,114,255
THERMAL CONDUCTIVITY APPARATUS
Charles D. Niven, 337 Somerset St., W.,
Ottawa, Ontario, Canada
Filed Dec. 18, 1961, Ser. No. 159,949
2 Claims. (Cl. 73—15)

This invention relates to apparatus for determining values of thermal conductivity or relative thermal insulation values of sheet material, and in particular it relates to apparatus for determining the relative thermal insulation values of textiles and like materials.

The problem of quickly and conveniently determining the thermal insulation values of sheet material is not a new one. Considerable work has been done in the past in developing suitable apparatus to provide such values. Apparatus which has been developed is generally of one of the following three types:

(1) Apparatus having a pair of bodies with material to be evaluated between them and which utilizes a measurement of rate of heat flow through the material from one to the other body to arrive at the thermal insulation value of the material.

(2) Apparatus which maintains a body covered with a material to be evaluated at a constant temperature and utilizes a measurement of energy necessary to maintain the body at its constant temperature to arrive at the thermal insulation value of the material, and (3) Apparatus which employs a heated body covered by a material to be evaluated and which utilizes a measurement of time of cooling of the body to evaluate the thermal insulation properties of the material.

Apparatus of type (1) above has not proven satisfactory. The pressure exerted by the two discs, plates or other bodies between which the sheet material is placed will affect the measurement considerably. Also the measurement of rate of heat flow is comparatively difficult.

Results obtained by measurements made with apparatus of type (2) above have generally been more satisfactory. However, this type of apparatus is relatively complex and expensive, and the measurement procedures difficult. One such apparatus comprises a thermostatically controlled heated main plate with a thermostatically controlled heated guard ring surrounding the edge of the main plate, and a manually controlled heated guard plate spaced beneath the bottom of the main plate. Sheet material to be evaluated is placed over the main plate and guard ring. Thermocouples are provided at many places for measuring the temperature of the main plate and the difference in temperature between plate and guard ring. Accurate measurement of energy input to the apparatus is necessary to achieve accurate evaluation of the sheet material. It will be seen that the measurement procedures required by this apparatus are complex and that the apparatus is not suitable for use by a nontechnical operator.

Apparatus of type (3) above differs considerably from the first two types and is the simplest type. The measurement procedures are normally less complicated than with other apparatus and the results achieved give a very good approximation of the thermal insulation properties of textiles tested. Prior art apparatus of this type (3) uses a heated cylinder around which a textile to be evaluated is wrapped, and the time required for the temperature of the cylinder to fall through a predetermined range is measured. This apparatus has the disadvantage that samples must be cut from the textile being evaluated. The sample must be cut to fit neatly around the cylinder with no overlapping, no slackness and no stretching. The ends of the cylinder introduce a further complication because either the ends must also be covered by the textile or heat loss from the ends must be prevented. Both of these alternatives have inherent disadvantages. In the first alternative it is difficult to cut a sample to completely and neatly cover the entire cylinder including the ends. In the second alternative, it is quite difficult to reduce the end heat losses to a low enough value to result in satisfactory evaluation of a textile sample. Regardless of which alternative is used, the prior art apparatus requires a sample be cut from the textile material to be evaluated.

It is apparent that if a type (3) apparatus were available in which the heated body was not a cylinder but had a plane surface for use in the measurement, then such apparatus would overcome a major disadvantage of the prior art. The textile could then be spread over the plane surface without cutting and there would be no problem in preventing stretching or slackness. The prior art has not produced a satisfactory apparatus of this sort.

This invention seeks to provide an apparatus of the aforementioned type (3) that is simple, inexpensive and capable of use by a non-technical operator. The apparatus does not require a sample to be cut from the textile or other sheet material for evaluation. This apparatus enables manufacturers and retailers to ascertain on their own premises the thermal insulation values of textiles and like materials.

It is therefore an object of this invention to provide a relatively inexpensive apparatus that is easily used by a non-technical operator for determining thermal insulation values of sheet material.

It is another object of this invention to provide a relatively simple apparatus for determining the thermal insulation values of textiles that does not normally require samples to be cut from the textile.

These and other objects of the invention will appear from the following description taken in conjunction with the accompanying drawings in which.

Briefly, the present invention is for apparatus for determining the thermal insulation value of a sheet material comprising a metal casing or guard casing having side walls and a bottom, a metal flange fixed to the top edge of said side walls in thermal contact therewith and extending inwardly of said side walls, said flange defining a regular opening into the interior of said casing, means to maintain the temperature of said casing substantially at a predetermined level, a metal block having a flat upper surface and side surfaces in a shape of the same configuration as said regular opening, the size of said block as defined by said side surfaces being smaller than the size of said opening, thermal insulating means mounting said block in said opening with the flat surface substantially at the same level as the upper surface of said flange and with said side surfaces being evenly spaced from the edge of said flange defining said opening, an electrical heater within said block, electrical contact means extending through said casing and having a first and a second position, said contact means in said first position contacting said heater and connecting said heater to a power source to raise the temperature of said block and in said second position disconnecting said heater from said power source and thermally isolating said block from said contact means, and temperature responsive means to indicate the temperature of said block.

The invention is also for a method by which the determination of thermal insulation value is made. Briefly, the invention is also for a method for determining the thermal insulation value of a textile using a metal block having a flat upper surface, side surfaces and a bottom surface, comprising the steps of covering said flat upper surface with said textile, supplying heat to the areas adjacent said side surfaces and said bottom surface to raise these areas substantially to a predetermined temperature for a length of time sufficient to establish thermal equilibrium and substantially maintaining said predetermined temperature in said areas throughout the determination of said thermal insulation value, supplying heat independently within said blocks to raise the temperature of said block above a predetermined narrow range of temperature, said predetermined narrow range of temperature having an upper temperature substantially equal to said predetermined temperature, stopping the independent supply of heat to said block to cause the temperature of the block to decrease by heat loss from its upper surface, and measuring the time taken for the block temperature to fall through said predetermined narrow range to provide an indication of thermal insulation value.

Figure 1:
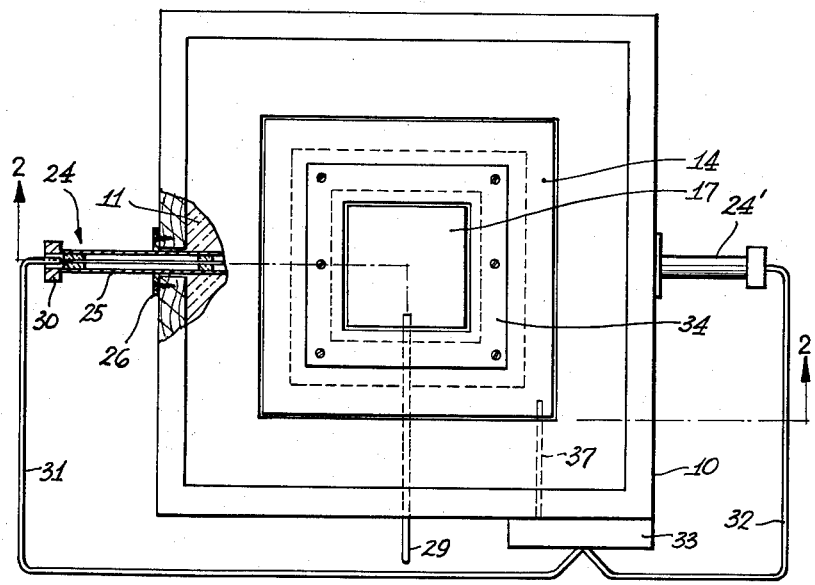
FIGURE 1 is a top view of a preferred form of the invention.
Figure 2:
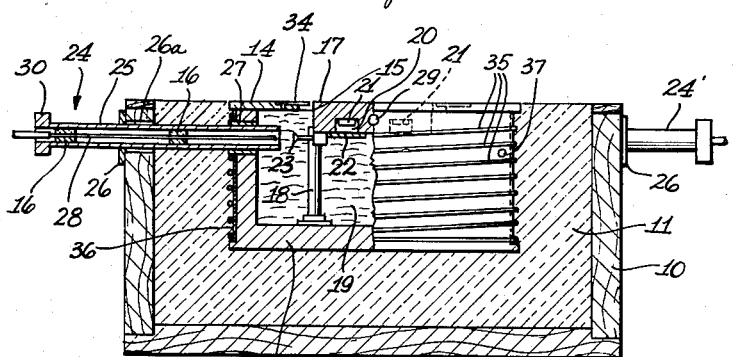
FIGURE 2 is a sectional view taken along line 2—2 of FIGURE 1.

Referring now to FIGURES 1 and 2, there is shown a wooden box 10 containing a massive metal casing 12 (i.e. with walls about the order of one inch in thickness) and a thick layer of thermal insulation 11 substantially filling the space between box 10 and casing 12. The insulation 11 may be, for example, a type of expanded cellular polystyrene insulation or similar insulation. In order that reasonably good temperature control of the casing 12 can be exercised, the casing 12 is preferably made of material having relatively good thermal conductivity. While the material of casing 12 may be a metal having a heat conductivity as low as 0.08, the casing 12 is preferably of a metal having a heat conductivity in excess of about 0.40, for example, where heat conductivity is defined as the quantity of heat in calories transmitted per second through a plate one centimeter thick across an area of one square centimeter when the temperature difference is one degree centigrade. By way of further example, preferred metals for casing 12 that are readily available are aluminum and copper while brass and steel which are also available are quite satisfactory.

A metal flange 14, preferably of the same metal as casing 12, is mounted all around the top edge of casing 12 in thermal contact therewith. The flange 14 extends inwardly of the side walls with the inner edge 15 defining a square opening.

Pillars 18 (only one of which is seen in FIGURE 2), of good thermal insulating material, rest on the bottom of casing 12 and extend upwards to support a metal block 17 in the opening defined by edge 15 of flange 14. The metal block 17 has a flat square upper surface and plane side surfaces. The size of the block 17 as defined by its side surfaces, that is the size of the square cross-section of the block not considering thickness, is smaller than the opening defined by edge 15 of flange 14. The pillars 18 support block 17 so that its flat upper surface is level with or slightly higher than the upper surface of flange 14, and the side surfaces are evenly spaced from edge 15. The block 17 may be of a metal with a heat conductivity as low as 0.08 cal./sec./sq. cm./cm./° C. and satisfactory results obtained, however, it is preferred to use a metal having a heat conductivity in excess of about 0.40 cal./sec./sq. cm./cm./° C., for example. Suitable preferred metals that are readily available and not excessively expensive are, for example, aluminum and copper. As further examples, brass and steel, which do not have quite as high a thermal conductivity but are readily available, are quite satisfactory. While not of critical significance, the size of block 17 is given by way of example as being 9″ x 9″ x 1″.

It is desirable to fill the casing 12 with goose down 19 or like material to reduce air currents within casing 12 and maintain more stable temperature distribution, and for the same reason it is desirable to close substantially the gap or space between the inner edge 15 of flange 14 and the edge of block 17 with a thin strip 34 of material having good thermal insulation value. The very thin flat strip 34 may be recessed into the top surface of flange 14 and secured by screws or other means so that it projects towards block 17 as shown.

The metal block 17 is provided with two grooves or depressions 20 equally spaced in its bottom surface. Each of the grooves accommodates an electrical heater element 21. A metal plate 22 covers each groove 20 to enclose the heater element 21. Alternately, the heater element may be cast or similarly embedded in block 17. The ends of the heater element 21 are connected to contacts 23 and 23′ mounted from opposite sides of the bottom of block 17. A finely calibrated thermometer 29 or other temperature indicating device is mounted with its temperature sensitive element in the interior of metal block 17 and its indicating portion extending outside box 10.

In order to heat block 17, electrical contact must be made between heater element 21 and a source of electrical power. Wires could be permanently fastened to heater element 21 and extend outside box 10 where convenient connection could be made. However, it is desirable to be able to break thermal contact between heater 21 and any conductors supplying power to it so that the heater 21 (and block 17) will be thermally isolated during the measurement from these conductors. One way of achieving this thermal isolation is shown in the drawings and described below. Other means of achieving the desired thermal isolation would of course be satisfactory.

A pair of contact probes 24 and 24′ are located at each side of block 17 to contact the respective contacts 23 and 23′. The contact probes 24 and 24′ are similar and only probe 24 is described in detail. Where shown in the drawings, parts on probe 24′ which correspond to parts on probe 24 bear like designation numbers but are primed. The probe 24 has an outer cylindrical insulating member 25 which extends through an opening in guide plate 26, through a hole 26a in wooden box 10, through insulation 11 and through a bushing 27 in a side wall of casing 12. The member 25 is slidably supported by the guide plate 26 and the bushing 27. A rigid inner conductor 28 runs through the interior of member 25 spaced from the walls of member 25 by spacers 16. The contact probe 24 may move to an inner position where the end of conductor 28 within casing 12 engages and makes electrical contact with the contact 23. The contact probe 24 may be withdrawn to an outer position where the conductor 28 does not make electrical contact with contact 23 and where there is no thermal engagement between probe 24 and block 17. Normally, when the probe 24 is in its outer position, the inner end is not projecting into the interior of casing 12. In FIGURE 2 the probe 24 is shown in a partly withdrawn position. A handle 30 on probe 24 facilitates movement of the probe by an operator to its inner and outer positions.

The conductors 28 and 28′ in probes 24 and 24′ are connected to wire conductors 31 and 32 respectively, and wires 31 and 32 are connected to a source of electrical power preferably with an ammeter in the circuit to indicate when current is flowing. The circuitry is described in more detail hereinafter in connection with FIGURE 3.

The metal casing 12 has a heater and a thermostat to maintain the casing temperature substantially at a predetermined temperature. The heater comprises a ribbon of electrical heater wire 35 wound around the outside of casing 12 and electrically insulated from casing 12 by a sheet of electrical insulation 36. The electrical insulation 36 may, for example, be a sheet of asbestos, and the wire 35 may be fixed in place on insulation 36 by painting with water glass or other suitable material. A thermostat 37 which has its temperature sensitive element embedded in casing 12, is connected to the circuitry in control box 33 and controls electric current to heater wire 35 to provide the required temperature of casing 12.

Figure 3:
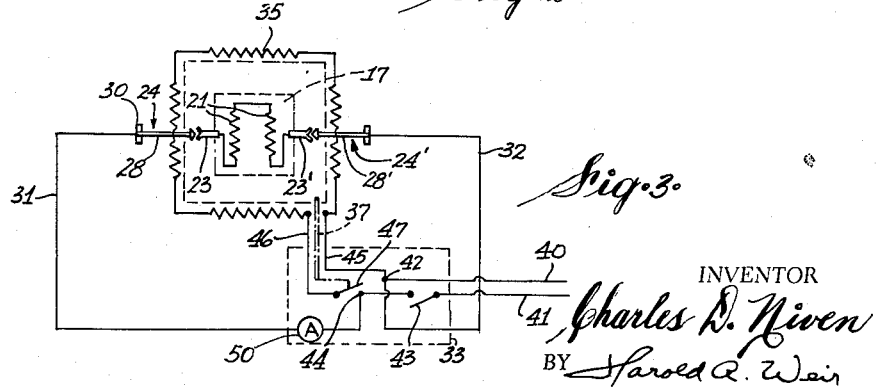
FIGURE 3 is a schematic circuit diagram of the electrical part of the apparatus.

Referring now to FIGURE 3, the two heating circuits are shown schematically, namely the circuit to maintain casing 12 at a predetermined temperature and the circuit to heat block 17. Electrical power is supplied to control box 33 over two conductors 40 and 41. Conductor 40 is connected to terminal 42, and conductor 41 is connected through an "off-on" switch 43 to terminal 44. In the circuit for supplying controlled heat to casing 12, a conductor 45 connects terminal 42 to one side of heater wire 35 and a conductor 46 connects the other side of heater wire 35 through a thermostatic switch 47 (operated by thermostat 37) to terminal 44. It will be apparent that the thermostat 37 need not operate switch 47 directly as indicated in FIGURE 3. The thermostat 37 may be used to actuate a relay which opens and closes switch 47 in accordance with thermostat 37.

In the circuit for heating block 17, the conductors 28 and 28′ in probes 24 and 24′ are connected by conductors 31 and 32 to terminals 44 and 42 respectively. An ammeter 50 is series connected in conductor 31 to indicate current flow. When probes 24 and 24′ are pushed inwards current flows through heater element 21.

In the operation of the apparatus described, the circuit supplying heat to casing 12 must be switched on some time prior to the use of the apparatus for determining a thermal insulation value so that the predetermined temperature (that is the preset thermostated temperature) is reached before the apparatus is used. In actual practice the casing heater may be left connected and operating all the time. The temperature of casing 12 would then be at the predetermined temperature all the time. When the apparatus is used the block 17 is also raised to this predetermined temperature. The heat loss from the sides and bottom surface of the block 17 will be negligible while the block and casing are substantially at the same temperature. Thus, in effect, the casing 12 compels the heat loss from block 17 to take place almost entirely from its upper surface, that is from the surface covered by the material being evaluated.

The room temperature or ambient temperature should be held relatively constant for a period of time preceding the measurement and particularly during the measurement. However, the apparatus of the invention does not require ambient temperature be controlled so accurately or for such long periods of time as does some of the prior art apparatus. Satisfactory results are obtained, for example, when the ambient temperature is within ±½° F. for periods of one hour prior to and during the measurement.

To determine the thermal insulation value of a given textile, the textile is placed on the apparatus so that it covers the block 17, flange 14 and extends over insulation 11 adjacent flange 14. If the guard casing 12 has already reached its predetermined temperature, the block 17 is then heated. To do this the probes 24 and 24′ are inserted so that current flows through heater 21 and this is indicated on ammeter 50. After a period of time probes 24 and 24′ are withdrawn. Because it takes time for heat from heater element 21 to spread throughout block 17, the temperature indicated by thermometer 29 will continue to rise after the probes are withdrawn. The amount of this lag is dependent on the material of the block 17. If the first insertion of probes 24 and 24′ does not result in the temperature of block 17 rising above the predetermined temperature of casing 12, then the probes are pushed in again for a short period of time. This is repeated until the temperature of block 17 rises above the predetermined temperature, for example, by at least one half a degree centigrade. The block 17 is then allowed to cool, and when it has cooled to the predetermined casing temperature a time measurement is started. When block 17 has fallen through a narrow temperature range beginning at the predetermined temperature, the time measurement is stopped. The time taken for the temperature to fall through this narrow range gives an indication of the thermal insulation value of the textile.

While not of critical significance to the operation of the apparatus of this invention, satisfactory results have been obtained with, for example, a predetermined temperature of 49° C. and with a narrow temperature range over which the time measurement is made of from 49.0° C. to 48.5° C.

Obviously two samples of textiles or like materials can be compared as to their relative thermal insulation values by measuring cooling times under identical conditions. It is often desirable, however, to express the results in practical insulation units, for instance in "clo" units for textiles. In order to do this the apparatus must be calibrated for a particular ambient or room temperature at which measurements are to be made. To calibrate the apparatus samples of materials whose thermal insulation values are known from measurement on the complex laboratory standard apparatus are placed on the apparatus and the cooling time ascertained in the usual manner. By plotting cooling time for these known samples against their insulation value a calibration curve can be obtained for any particular ambient temperature. Fortunately the relationship is for all practical purposes a linear relationship. Consequently one standard sample will serve to calibrate the apparatus although two or more will give an additional check.

The reason that the calibration is linear for practical purposes appears to be because of the following considerations. Although the cooling time method of determining thermal insulation value by its very nature implies a change in temperature on one surface of the sample, the change causes only a drop of ¼° C. for the sample for a block temperature change of ½° C., and consequently for samples of low heat capacity the heat absorbed by the plate from the sample is negligible in comparison to the heat lost by conduction through the sample. Thus, the following equation applies—

$$Q = C(t_1 - t_2)A.T$$

where C is conductance, $t_1 - t_2$ is temperature difference, A is the area of the sample concerned, T is the time, and Q is the quantity of heat.

To achieve satisfactory results with the apparatus of this invention, ample time must be allowed for reaching the "steady state" distribution of temperature inside the sample before taking a cooling time measurement. If a sample is placed on the apparatus cold, the block temperature raised and a cooling measurement made too soon (before a steady state is reached), then the heat capacity of the sample cannot be neglected even if it has a low specific heat. Readings made too soon will therefore be inaccurate. If it is suspected that a measurement was made too soon a second measurement can be made. When two subsequent readings are the same, the steady state has been reached.

It may be desirable to have some means for accelerating the sample to a steady state condition. This may be done by laying the sample on an auxiliary plate, thermostatically controlled to the guard casing temperature (the predetermined temperature) and leaving it there for a sufficient time to establish the required temperature gradient. The sample may then be quickly transferred to the test apparatus and is ready for immediate testing.

When determining the thermal insulation value of materials that are very good thermal insulators, it becomes more important to have the narrow range of temperature through which the cooling measurement of block 17 is made close to the flange temperature of casing 12. This is because the heat loss through a good insulator takes place so slowly that edge losses from block 17 become more critical. The edge losses are, of course, at a minimum when there is no temperature difference between the block and the flange.

While a preferred form of the invention has been described, it will be apparent that various modifications can be made without departing from the true spirit and scope of the invention. For example, the block 17 has been described as being square, that is the sides of the block define a square. The block may, however, be rectangular or circular as defined by its side walls. In fact the block may have any regular shape or cross-section. In each case the flange 14 and casing 12 would be of a corresponding shape so that the spacing between flange and block and between casing wall and block would be uniform.

It will be seen that the apparatus according to the invention is relatively simple and inexpensive and provides a means operable by a non-technical operator for determining thermal insulation values of textiles and like materials.

I claim:

1. Apparatus for determining the thermal insulation value of sheet material comprising,
   a metal casing having side walls and a bottom,
   a metal flange fixed to the top edge of said side walls in thermal contact therewith and extending inwardly of said side walls, said flange defining a regular opening into the interior of said casing,
   means to maintain the temperature of said casing substantially at a predetermined level,
   a metal block having a flat upper surface and side surfaces in a shape of the same configuration as said regular opening, the size of said block as defined by said side surfaces being smaller than the size of said opening,
   thermal insulating means mounting said block in said opening with said flat surface substantially at the same level as the upper surface of said flange and with the said side surfaces of said block evenly spaced from the edge of said flange defining said opening,
   an electrical heater within said block,
   a source of electrical power,
   conductor means for electrically connecting said heater to said power source to raise the temperature of said block and for breaking electrical and thermal contact with said heater and block, and
   temperature responsive means to indicate the temperature of said block.

2. Apparatus for determining the thermal insulation value of a sheet material comprising,
   a metal casing having side walls and a bottom,
   a metal flange fixed to the top edge of said side walls in thermal contact therewith and extending inwardly of said side walls, said flange defining a regular opening into the interior of said casing,
   means to maintain the temperature of said casing substantially at a predetermined level,
   a metal block having a flat upper surface and side surfaces in a shape of the same configuration as said regular opening, the size of said block as defined by said side surfaces being smaller than the size of said opening,
   thermal insulating means mounting said block in said opening with said flat surface substantially at the same level as the upper surface of said flange and with said side surfaces of said block being evenly spaced from the edge of said flange defining said opening, an electrical heater within said block.
   electrical contact means extending through said casing and having a first and a second position, said contact means in said first position conacting said heater and connecting said heater to a source of electrical power to raise the temperature of said block and in said second position disconnecting said heater from said source of power and thermally isolating said block from said contact means, and
   temperature responsive means to indicate the temperature of said block.

References Cited in the file of this patent

UNITED STATES PATENTS

| | | |
|---|---|---|
| 1,558,828 | Brace | Oct. 27, 1925 |
| 2,347,661 | Butland | May 2, 1944 |

FOREIGN PATENTS

| | | |
|---|---|---|
| 119,361 | Russia | Aug. 2, 1958 |